US010373362B2

(12) United States Patent
Fine et al.

(10) Patent No.: US 10,373,362 B2
(45) Date of Patent: Aug. 6, 2019

(54) SYSTEMS AND METHODS FOR ADAPTIVE STITCHING OF DIGITAL IMAGES

(71) Applicant: HumanEyes Technologies Ltd., Neve Ilan (IL)

(72) Inventors: Shmuel Fine, Rehovot (IL); Yitzchak Tulbovich, ModiIn Elit (IL); Ilya Kottel, Bat-Yam (IL); Anton Bar, Jerusalem (IL)

(73) Assignee: HumanEyes Technologies Ltd., Neve Ilan (IL)

( * ) Notice: Subject to any disclaimer, the term of this patent is extended or adjusted under 35 U.S.C. 154(b) by 89 days.

(21) Appl. No.: 15/642,377

(22) Filed: Jul. 6, 2017

(65) Prior Publication Data

US 2019/0012818 A1    Jan. 10, 2019

(51) Int. Cl.
| | | |
|---|---|---|
| *G06T 7/593* | (2017.01) | |
| *G06T 11/60* | (2006.01) | |
| *H04N 5/232* | (2006.01) | |
| *G06T 3/40* | (2006.01) | |
| *H04N 5/262* | (2006.01) | |
| *H04N 13/243* | (2018.01) | |
| *H04N 13/00* | (2018.01) | |

(52) U.S. Cl.
CPC ............ *G06T 11/60* (2013.01); *G06T 3/4038* (2013.01); *G06T 7/593* (2017.01); *H04N 5/23238* (2013.01); *H04N 5/23296* (2013.01); *H04N 5/2624* (2013.01); *H04N 13/243* (2018.05); *H04N 2013/0081* (2013.01)

(58) Field of Classification Search
CPC ..... G06T 11/60; G06T 7/593; H04N 5/23238; H04N 5/23296

USPC .......................................................... 348/38
See application file for complete search history.

(56) References Cited

U.S. PATENT DOCUMENTS 9,277,122 B1    3/2016  Imura et al.
9,378,544 B2 *  6/2016  Cha .................... H04N 5/23238
(Continued)

FOREIGN PATENT DOCUMENTS

WO    WO 2019/008564    1/2019

OTHER PUBLICATIONS

International Search Report and the Written Opinion dated Aug. 1, 2018 From the International Searching Authority Re. Application No. PCT/IL2018/050426. (13 Pages).

*Primary Examiner* — Jamie J Atala
*Assistant Examiner* — James T Boylan

(57) ABSTRACT

There is provided a method of processing digital images associated with a parallax shift for creation of a digital panoramic image, comprising: computing a respective depth map storing values denoting distances to regions of a scene, for each camera located at a respective first position, capturing a respective image by each camera, virtually rotating each camera to second positions at respective angles computed according to a certain region of the image relative to the center point of the camera, mapping between each respective region of the image associated with each respective second position and a corresponding region of the respective depth map computed for the respective camera, and adjusting intensity values of pixels of the regions of each image according to corresponding distance values of the mapped regions of the depth map of the respective camera, to create a plurality of adjusted images for creation of the panoramic image.

16 Claims, 13 Drawing Sheets

(56) References Cited

U.S. PATENT DOCUMENTS

| | | | |
|---|---|---|---|
| 2003/0235344 A1* | 12/2003 | Kang | G06K 9/32 382/284 |
| 2010/0013906 A1* | 1/2010 | Border | H04N 5/2259 348/36 |
| 2011/0242104 A1* | 10/2011 | Zhang | H04N 13/183 345/419 |
| 2012/0039525 A1* | 2/2012 | Tian | G06T 5/005 382/154 |
| 2012/0249730 A1 | 10/2012 | Lee | |
| 2013/0100132 A1* | 4/2013 | Katayama | H04N 13/275 345/420 |
| 2014/0098100 A1* | 4/2014 | Dane | G06T 15/20 345/427 |
| 2014/0267596 A1* | 9/2014 | Geerds | H04N 5/2252 348/38 |
| 2014/0307045 A1 | 10/2014 | Richardt et al. | |
| 2015/0178988 A1* | 6/2015 | Montserrat Mora | G06T 13/40 345/420 |
| 2015/0262029 A1 | 9/2015 | Pirchheim et al. | |
| 2015/0310669 A1* | 10/2015 | Kamat | G06T 19/006 345/633 |
| 2016/0353090 A1* | 12/2016 | Esteban | G02B 27/0172 |
| 2017/0019655 A1* | 1/2017 | Mueller | H04N 13/0217 |

* cited by examiner

SYSTEMS AND METHODS FOR ADAPTIVE STITCHING OF DIGITAL IMAGES

FIELD AND BACKGROUND OF THE INVENTION

The present invention, in some embodiments thereof, relates to panoramic images and, more specifically, but not exclusively, to systems and methods for processing digital images for creation of a panoramic image.

A panoramic image is an image that has visual information for angles around a viewer. Pixels of a color digital panoramic image define color and intensity for azimuthal angles and polar angles in a spherical coordinate system that defines the panoramic image.

360×180 panoramic images capture a 360-degree viewing space around the viewer, and 180 degrees above the viewer including top/zenith to bottom/nadir. The panoramic image captures the view of a person that can turn their head in any direction and angle, and see something.

SUMMARY OF THE INVENTION

According to a first aspect, a computer implemented method of processing digital images associated with a parallax shift for creation of a digital panoramic image, comprises: computing a respective depth map storing values denoting distances to regions of a scene, for each camera of a plurality of cameras located at a respective first position, capturing a respective image by each of the plurality of cameras at the respective first position, virtually rotating each of the plurality of cameras to a plurality of respective second positions at a respective angle around the center point of the respective camera, wherein each respective angle is computed according to a certain region of a plurality of regions of the image relative to the center point of the respective camera, mapping between each respective region of the image associated with each respective second position and a corresponding region of the respective depth map computed for the respective camera, adjusting intensity values of pixels of the regions of each respective image captured by each camera of the plurality of cameras according to corresponding distance values of the mapped regions of the depth map of the respective camera, to create a plurality of adjusted images, and stitching the plurality of adjusted images to create a panoramic image.

According to a second aspect, a system for processing digital images associated with a parallax shift for creation of a digital panoramic image, comprises: a non-transitory memory having stored thereon a code for execution by at least one hardware processor of a computing device, the code comprising: code for computing a respective depth map storing values denoting distances to regions of a scene, for each camera of a plurality of cameras located at a respective first position, code for capturing a respective image by each of the plurality of cameras at the respective first position, code for virtually rotating each of the plurality of cameras to a plurality of respective second positions at a respective angle around the center point of the respective camera, wherein each respective angle is computed according to a certain region of a plurality of regions of the image relative to the center point of the respective camera, code for mapping between each respective region of the image associated with each respective second position and a corresponding region of the respective depth map computed for the respective camera, code for adjusting intensity values of pixels of the regions of each respective image captured by each camera of the plurality of cameras according to corresponding distance values of the mapped regions of the depth map of the respective camera, to create a plurality of adjusted images, and code for stitching the plurality of adjusted images to create a panoramic image.

According to a third aspect, a computer program product for processing digital images associated with a parallax shift for creation of a digital panoramic image, comprises: a non-transitory memory having stored thereon a code for execution by at least one hardware processor of a computing device, the code comprising: instructions for computing a respective depth map storing values denoting distances to regions of a scene, for each camera of a plurality of cameras located at a respective first position, instructions for capturing a respective image by each of the plurality of cameras at the respective first position, instructions for virtually rotating each of the plurality of cameras to a plurality of respective second positions at a respective angle around the center point of the respective camera, instructions each respective angle is computed according to a certain region of a plurality of regions of the image relative to the center point of the respective camera, instructions for mapping between each respective region of the image associated with each respective second position and a corresponding region of the respective depth map computed for the respective camera, instructions for adjusting intensity values of pixels of the regions of each respective image captured by each camera of the plurality of cameras according to corresponding distance values of the mapped regions of the depth map of the respective camera, to create a plurality of adjusted images, and instructions for stitching the plurality of adjusted images to create a panoramic image.

The systems and/or methods and/or code instructions described herein provide a technical solution to the technical problem of combining digital images (optionally overlapping digital images) having a parallax shift into a panoramic image. The parallax shift is created when a single camera is displaced to capture each of the digital images, and/or when multiple cameras that each capture a digital image are located at different positions. The parallax shift occurs between images when camera(s) that capture the images are displaced so that their nodal point is located at different positions. The images with the parallel shift include both close and far objects. Existing methods are complex and do not produce natural and/or high quality panoramic images, for example, in the presence of both close and far objects that arise due to the parallax shift, the background may be duplicated, and/or the close objects may be cut. Additional details explaining the technical problem are discussed below with reference to FIGS. 5A-5C.

The systems and/or methods and/or code instructions described herein improve performance of a computing device that processes individual digital images to create an improved and/or higher quality panoramic image. The computing device corrects for the parallax shift(s) between captured digital images. The higher quality panoramic image is created by improved quality of stitching of the parallax corrected digital images. The computing device processes individual images to create improved higher quality spherical and/or multi-view panoramic images.

In a further implementation form of the first, second, and third aspects, the mapping between regions associated with each respective second position to corresponding regions of the respective depth map is computed based on: computing a plurality of rays from a center of the respective camera at the first position that captured the image to corresponding regions of the depth map associated with the respective camera, wherein a length of each respective ray is obtained from the distance values of the corresponding region of the depth map, translating each of the plurality of rays from the center of the respective camera to a surface of a projection sphere centered at the center of the respective camera, wherein each of the plurality of rays is translated while maintaining the direction, orientation, and length of the respective ray such that each of the plurality of rays is tangent to the projection sphere, projecting the region at the distal end of each of the plurality of translated rays having the respective length to a corresponding region of the image captured by the respective camera, and adjusting the intensity value of at least one pixel of each region of the image captured by the respective camera according to the distance value of the projected region of the depth map of each of the plurality of translated rays.

In a further implementation form of the first, second, and third aspects, the mapping is performed according to intrinsic and extrinsic matrixes of the respective camera.

In a further implementation form of the first, second, and third aspects, regions of the depth map that cannot be mapped to corresponding regions of the image are assigned a minimum intensity value according to an intensity scale.

In a further implementation form of the first, second, and third aspects, the method further comprises and/or the processor is further configured to and/or the computer program product includes additional instructions for selecting at least one stitch of the adjusted plurality of images along a close object appearing in the plurality of adjusted images, wherein the close object is identified according to the respective depth map.

In a further implementation form of the first, second, and third aspects, the plurality of cameras are arranged as sets of stereoscopic pairs capturing a first and second set of stereoscopic pairs of overlapping images, wherein the respective depth map is computed for each of the stereoscopic pair of cameras, wherein stitching comprises stitching adjusted first and second sets of overlapping images to create a first and second panoramic image.

In a further implementation form of the first, second, and third aspects, the stitching is performed according to corresponding locations of the first and second panoramic images.

In a further implementation form of the first, second, and third aspects, the respective depth map is computed for each of the stereoscopic pair of cameras by performing, for each stereoscopic pair: mapping between each corresponding region imaged by each of the cameras of the stereoscopic pair, computing three dimensional (3D) coordinates of each corresponding region by triangulation of the respective corresponding region based on images captured by each of the cameras of the stereoscopic pair, and converting the 3D coordinates of each corresponding region according to an orientation and distance relative to the center of each camera of the stereoscopic pair.

In a further implementation form of the first, second, and third aspects, the method further comprises and/or the processor is further configured to and/or the computer program product includes additional instructions for interpolating undefined regions of the depth map.

In a further implementation form of the first, second, and third aspects, the method further comprises and/or the processor is further configured to and/or the computer program product includes additional instructions for analyzing at least one area in proximity to each of the stitches of the plurality of adjusted images, wherein the at least one area is located within an overlapping region, wherein the size of the at least one area is defined according to a requirement, computing a binocular disparity value for each feature point in each at least one area, identifying, for each stitch, the most frequent binocular disparity value for the at least one area of the respective stitch, computing, for each stitch, a radius value according to the most frequent binocular disparity value, wherein the mapping of regions of each image located within the at least one area in proximity to each of the stitches of each image is performed according to a projection sphere having the radius value associated with the respective stitch.

In a further implementation form of the first, second, and third aspects, a single depth value is assigned to the at least one area in proximity to each of the stitches of each overlapping region.

The assignment of a single depth value to each stitch, rather than creating and/or using data of larger portions of the (e.g., entire) depth map, reduces or prevents errors arising from processing of larger portions of the depth map. Creating a precise depth map is technically difficult due to outliers in homogenous areas. Such errors may produce large distortions in the created images that are stitches to form the panoramic image.

In a further implementation form of the first, second, and third aspects, the mapping is performed for the at least one area in proximity to each of the stitches of each overlapping region of the plurality of adjusted images.

In a further implementation form of the first, second, and third aspects, the mapping is not performed for other portions of the plurality of adjusted images external to the at least one area in proximity to each of the stitches.

The location of the corresponding stitches prevents or reduces variations between the left and right panoramic images.

In a further implementation form of the first, second, and third aspects, the plurality of cameras represent a single camera moved to different locations.

In a further implementation form of the first, second, and third aspects, the depth map is implemented as a two dimensional (2D) data structure, wherein the values denoting distances are calculated per image captured by each respective camera of the plurality of cameras.

In a further implementation form of the first, second, and third aspects, the depth maps are computed for each camera of the plurality of cameras within a time requirement that avoids variations between the depth maps due to motion of objects.

The time requirement may be selected to be close enough to avoid significant changes occurring in the environment from appearing differently in different depth maps. For example, to account for moving objects, for example, to prevent a scenario in which a car driving along a road appears in one location in one depth map captured at one point in time, and appearing in another location at another depth map captured a few seconds later when the car has driven a significant distance along the road.

In a further implementation form of the first, second, and third aspects, the received plurality of digital images capture a 360×180 field of view, and wherein at least one of the plurality of digital images overlaps with four other digital images.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
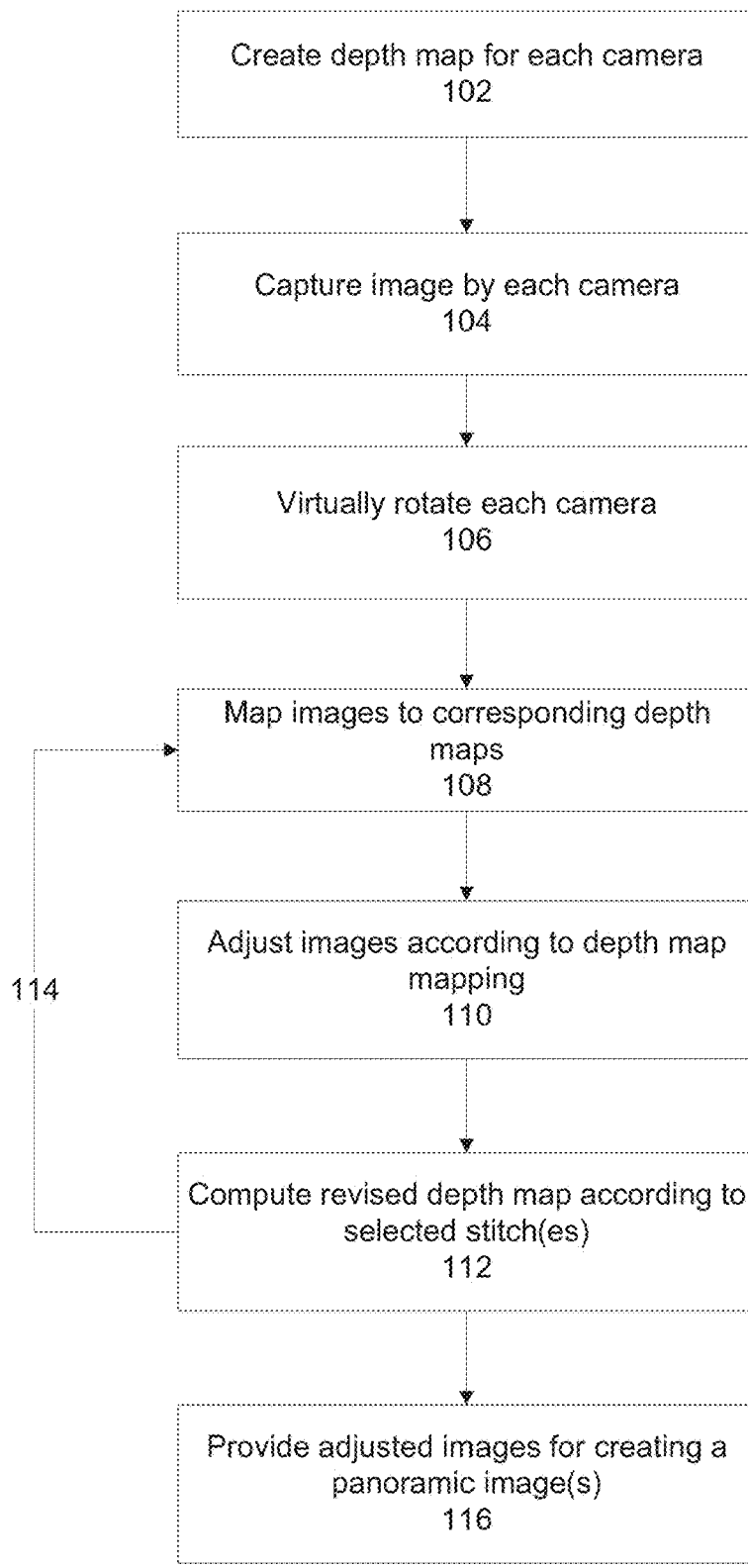
FIG. 1 is a flowchart of a method of correcting pixel intensity values of overlapping digital images associated with a parallax shift based on values of corresponding depth maps, in accordance with some embodiments of the present invention.

The present invention, in some embodiments thereof, relates to panoramic images and, more specifically, but not exclusively, to systems and methods for processing digital images for creation of a panoramic image.

An aspect of some embodiments of the present invention relates to an apparatus, a system, a method, and/or code instructions (stored in a data storage device executable by one or more hardware processors) for adjusting digital images associated with a parallax shift according to depth map(s), for creation of a digital panoramic image. The digital images are adjusted according to a depth map computed for each camera located at a first position in which a digital image is captured. The cameras are virtually rotated to multiple second positions each at a respective angle relative to the center point of the respective camera. Each rotation angle is computed according to a certain region (e.g., one or more pixels) of the image relative to the center point of the camera. Each region associated with each rotation angle of each image is mapped to a corresponding region of the depth map associated with the respective camera. Intensity values of the pixels of the regions of each image are adjusted according to the value of the corresponding mapped regions of the depth map. The adjusted images are provided for stitching to create the panoramic image.

The systems and/or methods and/or code instructions described herein provide a technical solution to the technical problem of combining digital images (optionally overlapping digital images) having a parallax shift into a panoramic image. The parallax shift is created when a single camera is displaced to capture each of the digital images, and/or when multiple cameras that each capture a digital image are located at different positions. The parallax shift occurs between images when camera(s) that capture the images are displaced so that their nodal point is located at different positions. The images with the parallel shift include both close and far objects. Existing methods are complex and do not produce natural and/or high quality panoramic images, for example, in the presence of both close and far objects that arise due to the parallax shift, the background may be duplicated, and/or the close objects may be cut. Additional details explaining the technical problem are discussed below with reference to FIGS. 5A-5C.

The systems and/or methods and/or code instructions described herein improve performance of a computing device that processes individual digital images to create an improved and/or higher quality panoramic image. The computing device corrects for the parallax shift(s) between captured digital images. The higher quality panoramic image is created by improved quality of stitching of the parallax corrected digital images. The computing device processes individual images to create improved higher quality spherical and/or multi-view panoramic images.

The systems and/or methods and/or code instructions stored in a storage device executed by one or more processors described here improve an underlying process within the technical field of image processing, in particular, within the field of processing individual images associated with a parallax shift to improve the quality of the panoramic image created from stitching of the individual images associated with the parallax shift. The systems and/or methods and/or code instructions stored in a storage device executed by one or more processors described here do not simply describe the computation of processed digital images using a mathematical operation and receiving and storing data, but combine the acts of computing a depth map(s), capturing an image(s) by each camera, mapping regions of the image(s) to the depth map(s), and adjusting the image(s) according to the corresponding depth map(s). By this, the systems and/or methods (e.g., code instructions stored in a storage device executed by one or more processors) described here go beyond the mere concept of simply retrieving and combining data using a computer.

The systems and/or methods and/or code instructions stored in a storage device executed by one or more processors described herein are tied to physical real-life components, including one of more of: one or more digital cameras that capture digital images that are stitched to create the panoramic image, a data storage device storing the captured digital image, the processed digital images, and/or the created panoramic image, a display that presents the created panoramic image, and a hardware processor that executes code instructions to process the digital images.

The systems and/or methods and/or code instructions stored in a storage device executed by one or more processors described herein create new data in the form of the processed digital images which are stitched to create a higher quality panoramic image.

Accordingly, the systems and/or methods and/or code described herein are inextricably tied to computing technology and/or physical components to overcome an actual technical problem arising in processing of digital images that are stitched to form a panoramic image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
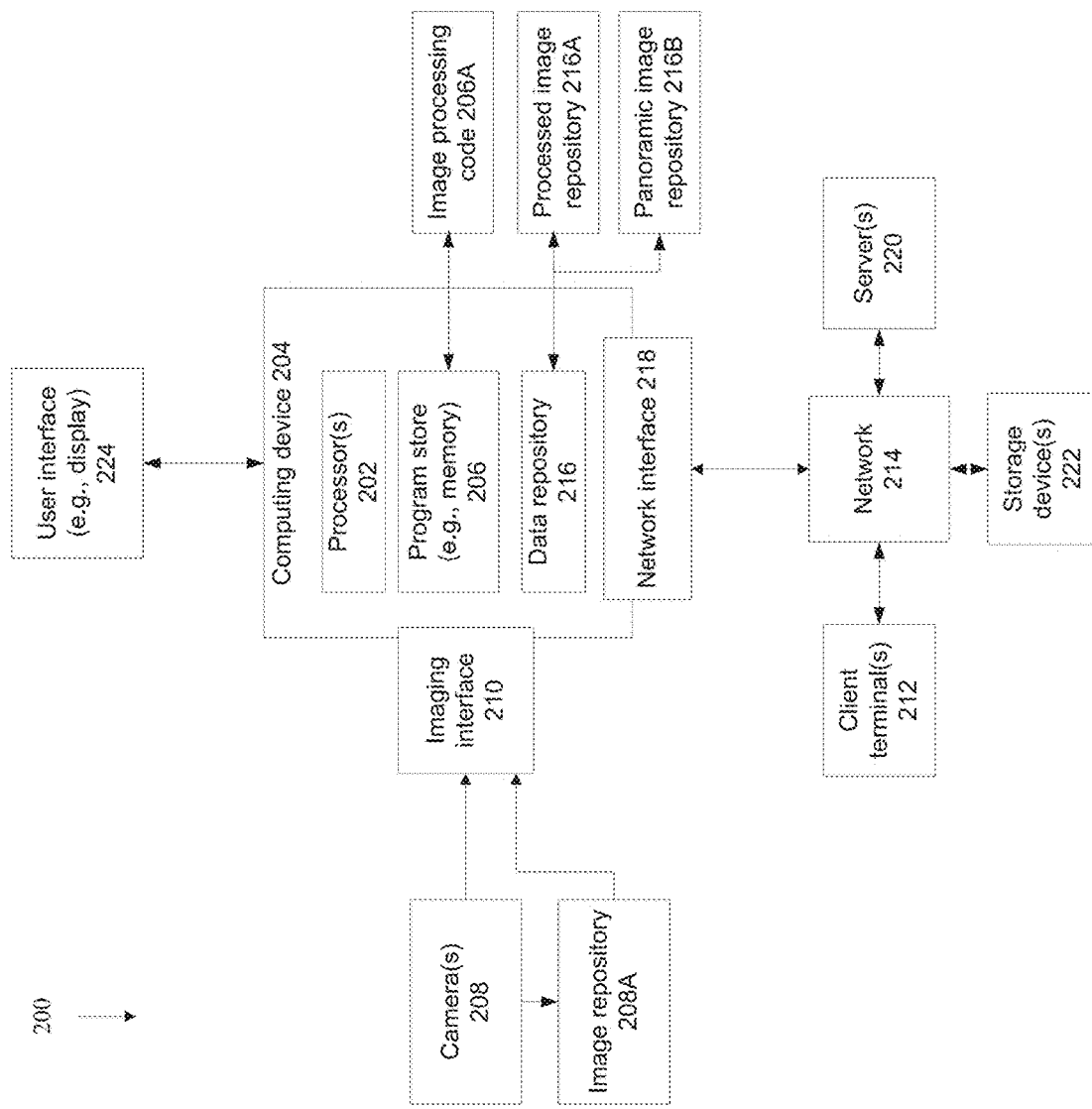
FIG. 2 is a block diagram of components of a system for receiving overlapping digital images associated with a parallax shift and outputting corrected digital images according to depth map(s), in accordance with some embodiments of the present invention.

Reference is now made to FIG. 1, which is a flowchart of a method of correcting pixel intensity values of overlapping digital images associated with a parallax shift based on values of corresponding depth maps, in accordance with some embodiments of the present invention. Reference is also made to FIG. 2, which is a block diagram of components of a system 200 for receiving overlapping digital images associated with a parallax shift and outputting corrected digital images according to at least one depth map corresponding to regions of the overlapping images, in accordance with some embodiments of the present invention. System 200 may implement the acts of the method described with reference to FIG. 1, by processor(s) 202 of a computing device 204 executing code instructions stored in a program store 206.

Computing device 204 receives multiple images (captured by digital camera(s) 208) for processing. The images capture parts of a scene that is formed by stitching the images into a panoramic image. The images may capture a 360 scene, optionally a 360×180 scene, or smaller scene angles. The images may be provided by one or more digital cameras 208, and/or obtained from an image repository 208A (e.g., a memory card within camera 208, a storage server, a removable storage device associated with camera 208, and/or a computing cloud). Digital camera(s) 208 may be implemented as a still image digital camera, and/or a video camera (in which case the images are obtained as frames of the video). Digital camera(s) 208 may capture two dimensional digital images (2D), and/or may capture three dimensions images (3D) optionally using two or more image sensors. Digital camera(s) 208 may capture color (e.g., red, green, blue based) images and/or in black and white images (in which case the channels described herein may refer to single channel of pixel intensity). Digital cameras 208 may be arranged as one or more sets of stereoscopic pairs, for example, as described with reference to FIG. 3.

When a single digital camera 208 is implemented, the parallax shift between images occurs when single camera 208 is moved to different locations. When multiple cameras 208 are implemented, the parallax shift occurs between images captured by the different cameras 208 each located at a different position.

Computing device 204 receives the image(s) captured by camera(s) 208 and/or stored on image repository 208A using one or more imaging interface(s) 210, for example, a wire connection, a wireless connection, other physical interface implementations, and/or virtual interfaces (e.g., software interface, application programming interface (API), software development kit (SDK)).

Computing device 204 may be implemented as, for example, a customized unit (e.g., as described with reference to FIG. 3), a client terminal, a server, a computing cloud, a mobile device, a desktop computer, a thin client, a Smartphone, a Tablet computer, a laptop computer, a wearable computer, glasses computer, and a watch computer. Computing device 204 may include locally stored software that performs one or more of the acts described with reference to FIG. 1, and/or may act as one or more servers (e.g., network server, web server, a computing cloud) that provides services (e.g., one or more of the acts described with reference to FIG. 1) to one or more client terminals 212 over a network 214, for example, providing software as a service (SaaS) to the client terminal(s) 212, providing an application for local download to the client terminal(s) 212, and/or providing functions using a remote access session to the client terminals 212, such as through a web browser and/or application stored on a mobile device.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include one or more processors (homogenous or heterogeneous), which may be arranged for parallel processing, as clusters and/or as one or more multi core processing units.

Storage device (also known herein as a program store, e.g., a memory) 206 stores code instructions implementable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores image processing code 206A that execute one or more acts of the method described with reference to FIG. 1.

Computing device 204 may include a data repository 216 for storing data, for example, a processed image repository 216A that stores the outputted processed images (which are stitched to form the panoramic images) and/or a panoramic image repository 216B that stores the created panoramic image(s). Data repository 216 may be implemented as, for example, a memory, a local hard-drive, a removable storage unit, an optical disk, a storage device, and/or as a remote server and/or computing cloud (e.g., accessed using a network connection).

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 214 (or another communication channel, such as through a direct link (e.g., cable, wireless) and/or indirect link (e.g., via an intermediary computing unit such as a server, and/or via a storage device) with one or more of:

Client terminal(s) 212, for example, when computing device 204 acts as a server providing SaaS and/or providing remote image processing services. The client terminals 212 may each provide the images to computing device 204 for processing over network 214. It is noted that camera(s) 208 (and/or the storage device storing image repository 208A) may be connected to client terminal 212, providing the images using network 214. The processed images and/or the created panoramic image may be provided to client terminal(s) 212.

Remotely located server 220 that receives the processed images and stitches the processed images to create the panoramic image. Server 220 may receive the panoramic image. Server 220 may locally display the panoramic image, store the processed images and/or panoramic image, and/or transmit the processed images and/or panoramic image to another server.

Storage device 222 that stores one or more of: image repository 208A, processed image repository 216A, and/or panoramic image repository 216B.

Computing device 204 and/or client terminal(s) include and/or are in communication with a user interface 224 that includes a mechanism for a user to enter data (e.g., designate and/or upload the captured images) and/or view presented data (e.g., the processed images and/or the created panoramic image). Exemplary user interfaces 224 include, for example, one or more of, a touchscreen, a display, a keyboard, a mouse, and voice activated software using speakers and microphone.

Figure 3:
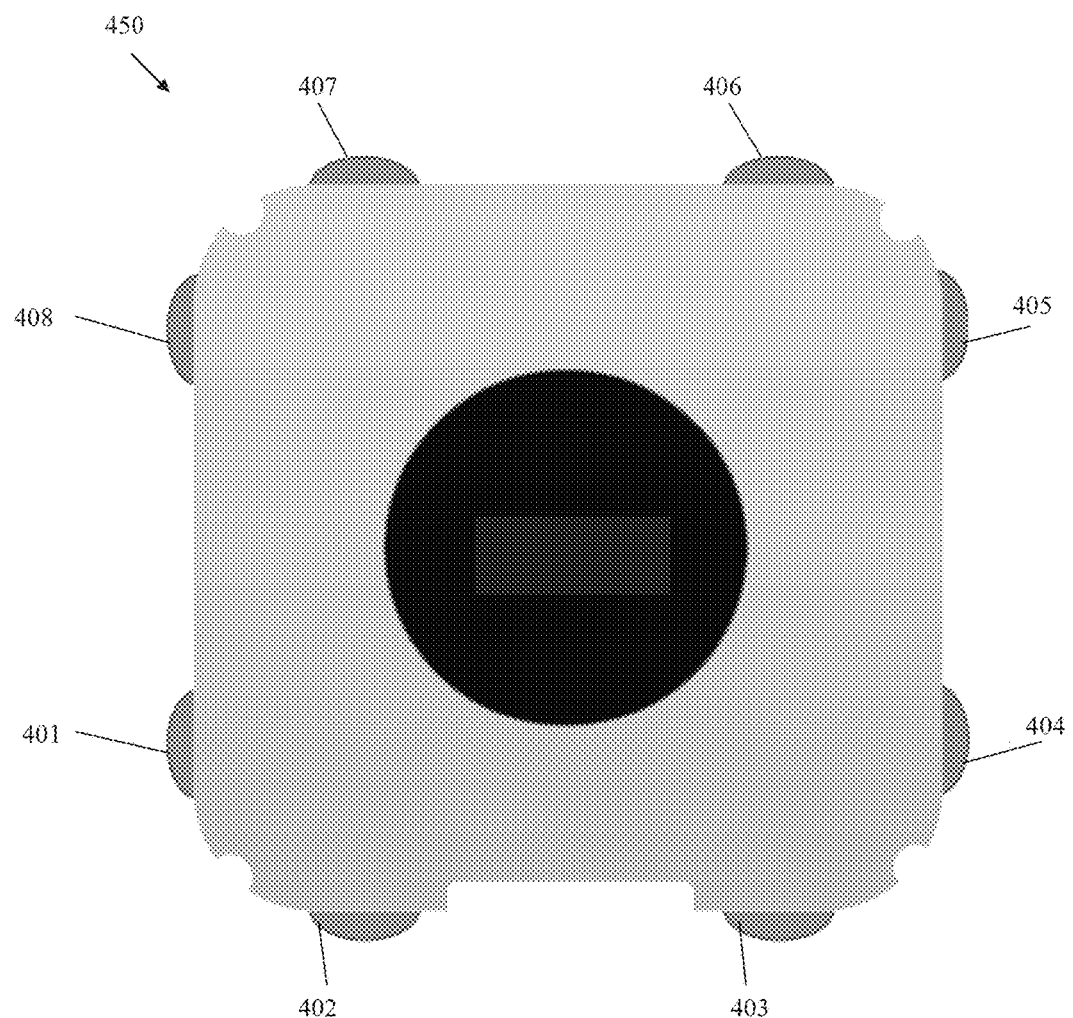
FIG. 3 is schematic depicting an exemplary device for capturing stereoscopic images that are combined to create a left panoramic image and a right panoramic image, in accordance with some embodiments of the present invention.

Reference is now made to FIG. 3, which is a schematic depicting an exemplary device 450 for capturing stereoscopic images that are combined to create a left panoramic image and a right panoramic image, in accordance with some embodiments of the present invention. Device 450 is shaped substantially as a square, and includes a pair of cameras to capture images for the left eye and right eye at each of the four corners of the square. Cameras 401, 403, 405, and 407 each located at a respective corner of the square capture an image, which form a first set of images for one eye. Cameras 402, 404, 406, and 408, each located at a corresponding corner of the square, respectfully capture another image, which form a second set of images for the other eye. The first and second sets of images may be processed and corrected independently to create the first and second panoramic images.

It is noted that cameras 401-408 capture images having parallel shifts relative to one another.

Device 450 may include (e.g., within its physical container) one or more of the following components described with reference to FIG. 2: camera(s) 208, image repository, imaging interface 210, computing device 204, processor(s) 202, memory 206, program repository 216, image processing code 206A, preprocessed image repository 216A, panoramic image repository 216N, network interface 218, and user interface 224.

At 102, a depth map is computed for each camera 208. The depth map may be computed by computing device 204. The depth map is computed at the current position of each camera 208.

Each depth map stores values denoting the distance to regions of a scene viewed by each respective camera. The regions may be defined, for example, based on pixel sizes of the camera used to create the depth map, based on value and/or ranges of coordinates (e.g., phi, theta), and/or based on a size requirement. The value (e.g., intensity value) stored by each element (e.g., pixel) of the depth map denotes the distance to the closest object in the real world around the respective camera (i.e., objects behind closer objects that are not visible to the camera capturing images used to compute the depth map may be ignored). The depth map may be implemented based on a scale, for example, from 0 to 255, or other divisions.

The depth map may be implemented as a two dimensional (2D) data structure, which may be presented as an image. Each element of the array may denote a certain value and/or range of values of coordinates, optionally radial coordinates, for example, each element denotes a certain phi value (and/or range of values) and a certain theta value (and/or range of values).

The values of the depth (optionally at each element of the array) may be denote gray scale intensity values, for example, 0 denotes black and 255 denotes white.

The values of the elements of each depth map may be computed for a single frame captured in time.

Optionally, for an implementation based on multiple cameras, the depth maps for the cameras are synchronized in time, optionally, computed within a time requirement. The time requirement may be selected to be close enough to avoid significant changes occurring in the environment from appearing differently in different depth maps. For example, to account for moving objects, for example, to prevent a scenario in which a car driving along a road appears in one location in one depth map captured at one point in time, and appearing in another location at another depth map captured a few seconds later when the car has driven a significant distance along the road.

The depth map may be computed for each member of each stereoscopic pair of cameras. For each stereoscopic pair, a mapping between each corresponding region imaged by each of the cameras of the stereoscopic pair is computed. The regions may include features and/or pixels, for example, an object viewed by each camera. Three dimensional (3D) coordinates (e.g., Cartesian coordinate) of each corresponding region are computed. The 3D coordinates may be computed by triangulation of the respective corresponding region based on images captured by each of the cameras of the stereoscopic pair. The 3D coordinates of each region are converted to an orientation (e.g., radial coordinates denoted by phi and theta) and distance (e.g., based on the radial coordinate system) relative to the center of each camera of the stereoscopic pair. Optionally, undefined values of the depth map are interpolated.

For device 450 described with reference to FIG. 3, eight depth maps are computed, one depth map for each of the left and right cameras for each of the four stereoscopic pairs.

Figure 6:
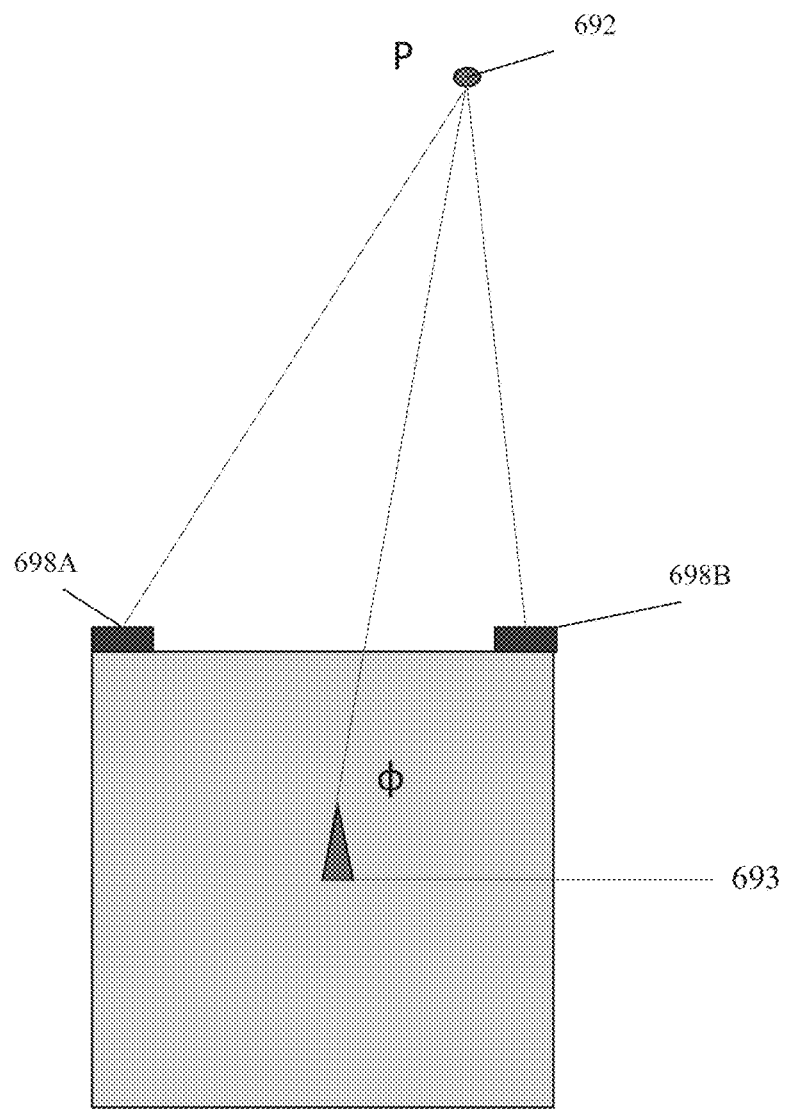
FIG. 6 is a schematic depicting computation for a certain point P of a depth map computed for a pair of stereoscopic cameras, in accordance with some embodiments of the present invention.

Reference is now made to FIG. 6, which is a schematic depicting computation for a certain region P 692 of a depth map computed for a pair of stereoscopic cameras 698A-B, in accordance with some embodiments of the present invention. Region P 692 is mapped by each camera 698A-B. The 3D coordinates of region P 692 are computed by triangulation 693 based on the images captured by cameras 698A-B. The 3D coordinates are converted to an orientation and distance relate to each camera 698A and 698B.

Referring now back to FIG. 1, at 104, digital images are captured for creating a digital panoramic image (e.g., captured by digital camera(s) 208 and/or stored by image repository 208A) are received by computing device 204 (e.g., using imaging interface 210). It is noted that block 104 may be executed as part of block 102, for example, the depth map may be created based on the captured digital images.

The digital images are captured by each of the cameras at the initial position.

The digital images are associated with a parallax shift.

Each digital image overlaps with one or more other digital images at an overlapping region(s). One or more images overlap with two, three, four, or more other digital images, for example, images within the interior of the panoramic image may overlap with four other digital images, by overlapping with one image at each border of the image at the interior of the panoramic image.

The digital images may be captured by one or multiple cameras 208. Each image is captured at a different angle, to cover a wide field of view, optionally a 360 degree field of view (or a smaller angle), optionally a 360×180 field of view (or smaller angles).

Optionally, the digital images are captured by a pair of cameras 208 arranged to capture stereoscopic images, for example, corresponding to the left eye and the right eye. There may be multiple pairs of cameras capturing images, for example, a set of cameras that capture images for the left eye, and another set of cameras that capture images for the right eye. Two panoramic images are created, one panoramic image for the left eye from the set of camera(s) that capture images for the left eye, and another panoramic image for the right eye from the set of camera(s) that capture images for the right eye.

Referring now back to FIG. 1, at 106, each of the cameras is virtually rotated to multiple other positions, by virtually changing angles (i.e., phi and/or theta values) of the camera. It is noted that the virtual rotation is performed computationally, without actually physically rotating the camera(s) away from the initial position at which the respective image(s) are captured.

Each rotation angle is computed according to a region of the image, relative to the center point of the respective camera.

Optionally, when the output resolution is denoted as X pixels (or regions) by Y pixels (or regions), for each $0<i<=X$ and for each $0<j<=Y$, the angle of each pixel $p(i,j)$ is calculated. The virtual rotation is computed according to the angle.

It is noted that the virtual rotation is not necessarily computed for all pixels. For example, the virtual rotation may be computed for groups of pixels. The virtual rotations may be determined according to the pixels of the output panoramic image, to compute intensity values of pixels sufficient to generate the panoramic image.

The virtual rotation may be transparent to the end user.

At 108, the region (e.g., pixels, groups of pixels) of each image associated with each virtually rotated position (i.e., each angle) is mapped to a corresponding region of the depth map computed for the respective camera.

Regions of the depth map that cannot be mapped to corresponding regions of the image (e.g., regions that are located behind another object) are assigned a minimum intensity value according to an intensity scale, optionally presented as black. The intensity scale may be, for example, based on 256, 1024, or other number of intensity levels. The larger the range, the better the precision.

The mapping of regions of the image associated with second positions and the corresponding depth map are computed for each (or subset of) defined value or range of values of phi and theta of a projection sphere computed relative to the center of each camera. Rays are computed from the center of the projection sphere of the respective camera (located at the rotated position) to corresponding regions of the depth map. The length of each ray is obtained from the distance values of the region of the depth map that the ray reaches, denoted as V(phi, theta). Each ray is translated from the center of the camera (i.e., the origin of the ray is positioned at the center of the projection sphere) to the surface of the projection sphere (i.e., the origin of the ray is positioned at the surface of the projection sphere). The rays are translated while maintain the direction and orientation and length of the ray. Each ray is tangent to the surface of the projection sphere. Each region (e.g., pixel, group of pixels) at the distal end of each translated rays having the defined length (denoted herein as T) is projected to a corresponding region of the image captured by the respective camera. The projection may be performed according to intrinsic and extrinsic matrixes of the respective camera.

At 110, the intensity value(s) of the pixel(s) of each projected region of each image are adjusted according to the corresponding value of the projected region of the depth map (denoted I). In terms of mathematical notation, for each image captured by each camera each region (phi, theta)=I.

Blocks 108-110 are executed for most or all of the radial coordinates and/or regions (e.g. ranges of values of phi and/or theta) represented by each depth map. The intersection point(s) of the projection tangents with the depth map are determined for the radial coordinates. The pixels intensity values of the images corresponding to each tangent are adjusted.

Figure 7:
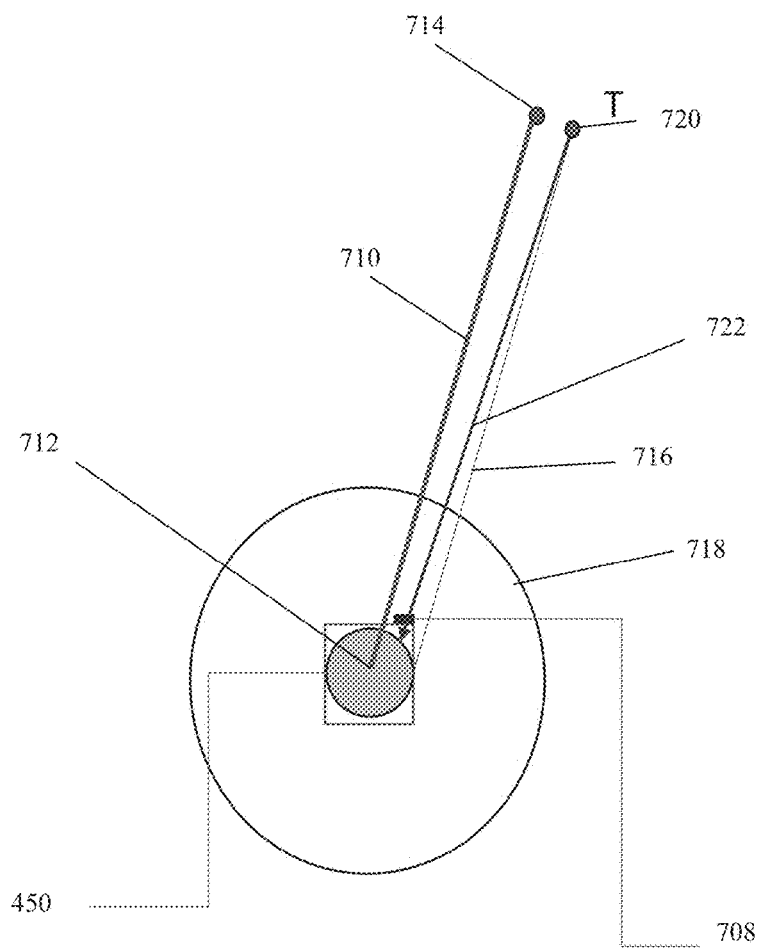
FIG. 7 is a schematic depicting mapping of a region of an image to a corresponding depth map and adjustment of the pixel values of the image based on the mapping, in accordance with some embodiments of the present invention.

Reference is now made to FIG. 7, which is a schematic depicting mapping of a region of an image to a corresponding depth map and adjustment of the pixel values bases on the mapping, in accordance with some embodiments of the present invention. A camera 708, optionally located on device 450 described with reference to FIG. 3, captures an image at the virtually rotated position, as described herein. A ray 710 is defined from a center 712 of camera 708 to a certain region 714 of the depth map located at a certain region (phi, theta) relative to center 712. The length of ray 710 is defined by the distance value corresponding to region (phi, theta) of the depth map, denoted as V.

Ray 710 is translated to a tangent 716 of a projection sphere 718 of camera 708. The translation to tangent 716 is performed while maintaining the direction and orientation and length V of ray 710. Point T 720 represents the distal end of tangent 716 having length V.

T 720 is projected (denoted by arrow 722) to a certain region of the image captured by camera 718 at the initial position. The pixels of the certain region (projection of T 720) are designated a certain intensity value denoted I. The pixels of the region of the image captured by camera 718 corresponding to the certain (phi, theta) are adjusted according to intensity value I.

Figure 8:
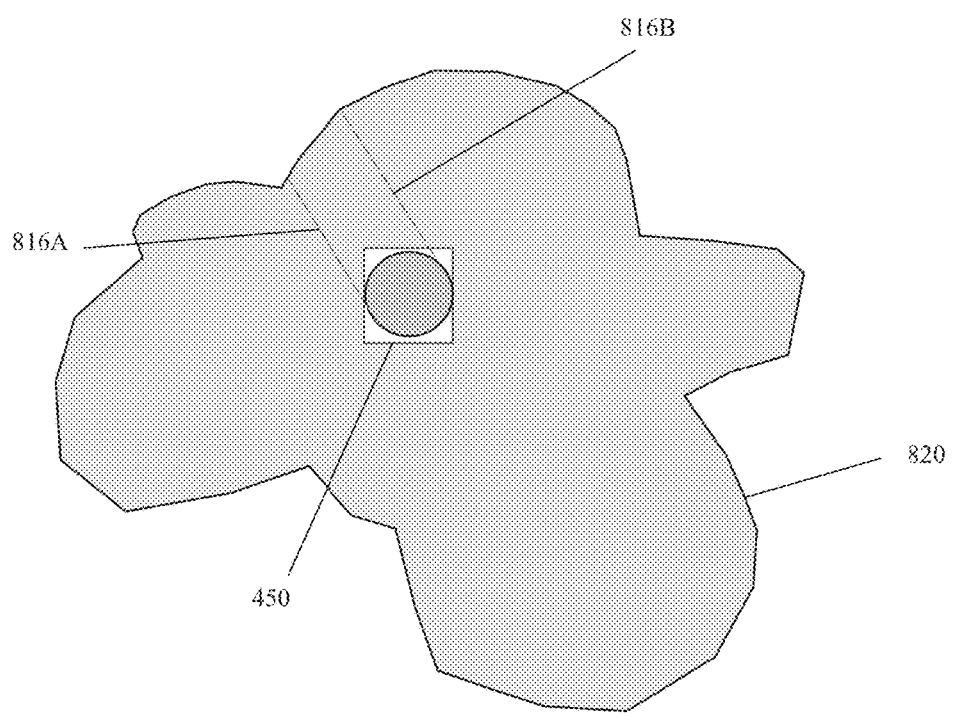
FIG. 8 is a schematic depicting a left tangent and a right tangent intersecting a depth map, for adjusting pixel intensity values of images captured by cameras, in accordance with some embodiments of the present invention.

Reference is now made to FIG. 8, which depicts a left tangent 816A and a right tangent 816B intersecting a depth map 820, for adjusting pixel intensity values of images captured by cameras (optionally of device 450 described with reference to FIG. 3), in accordance with some embodiments of the present invention. Left tangent 816A and right tangent 816B are associated with each member of a stereoscopic pair of cameras.

Referring now back to FIG. 1, at 112, optionally, stitches are selected according to the adjusted digital images for creating the digital panoramic image(s). The stitching may be selected by computing device 204, and/or a remote device (e.g., client terminal 212, and/or server 220). Stitching may be selected within the overlapping regions of the images.

Optionally, a revised depth map is created, adjusted, and/or selected according to the selected stitches and nearby region (e.g., within a requirement, for example, number of pixels surrounding each stitch, optionally within the overlap region). Optionally a single depth value is assigned to each stitch. The assignment of a single depth value to each stitch, rather than creating and/or using data of larger portions of the (e.g., entire) depth map, reduces or prevents errors arising from processing of larger portions of the depth map. Creating a precise depth map is technically difficult due to outliers in homogenous areas. Such errors may produce large distortions in the created images that are stitches to form the panoramic image.

The stitches are selected within the overlapping regions. For stereoscopic camera pairs, the stitch(es) of the images for the left eye may be selected to correspond (optionally within a tolerance requirement) to the stitch(es) of the images for the right eye. The location of the corresponding stitches prevents or reduces variations between the left and right panoramic images.

One or more areas in proximity to each of the selected stitches of the adjusted images are analyzed. The analyzed area(s) may be based on a requirement, for example, a certain number of pixels, and/or certain dimensions.

A binocular disparity value is computed for each feature point in each area in proximity to each of the selected stitches. The binocular disparity value is computed with reference to the cameras that captured the overlapping images being stitched. Exemplary feature points include: objects in the images, a grid of pixels or groups of pixels, and boundary regions in the images.

The most frequent binocular disparity value is identified for each area in proximity to each stitch (and/or for the areas in proximity to each stitch).

A radius value of the projection sphere associated with the area in proximity of each stitch is computed according to the most frequent binocular disparity value.

The radius defines the distance from the center of the camera to the respective object(s), according to the most frequent disparity for each area in proximity to each stitch (and/or for the areas in proximity to each stitch).

The radii from a ceiling area and a floor area are defined as the distance between the camera's center to an object at the Zenith point (the point right above the center of the camera) and to an object at the Nadir point, (the point right below the center of the camera). The radii (i.e., distances) are calculated according to the disparity between a pair of left-right cameras. The nadir and zenith points are indicative of locations past which the camera is unable to capture in the scene. The image captured by the camera does not capture portion of a scene above the zenith point and below the nadir point. The zenith and nadir points represent the camera's blind spots. The zenith and nadir points may include features for computing the disparity at the blind spots, for example, the zenith point may denote plain sky, and the nadir point may denote plain floor. In such cases the estimated distance and/or radius to zenith and/or nadir is calculated from the nearest top and/or bottom circle of about 5-10 degrees and interpolated and/or extrapolated.

At 114, blocks 108-110 are iterated. The projection sphere is computed according to the radius value based on the most frequent binocular disparity value.

The mapping of regions located within the area(s) in proximity to each of the stitches of each image is performed according to the projection sphere having the radius value associated with each respective stitch.

The mapping is performed for the area(s) in proximity to each of the stitches of each overlapping region of the plurality of overlapping images. The mapping is not necessarily performed for other portions of the overlapping images external to the area(s) in proximity to each of the stitches.

Optionally, a single depth value is assigned to each area in proximity to each of the stitches of each overlapping region of the overlapping images.

Optionally, the stitch(es) of the adjusted images are selected according to close features and/or objects appearing within the selected stitch(es). The stitch(es) are selected to intersect the close feature(s) and/or object(s). The distance to each object and/or feature appearing within a region including the selected stitch(es) is estimated based on the depth map(s). When one or more close objects are located within the region of two or more images, the stitch(es) are selected to intersect the close object(s) and/or features. Stitching the adjusted images along the stitch intersecting the close object depicts a single copy of each close object and/or feature. The selection of stitch(es) according to the close objects and/or features that are intersected by the stitch(es) prevents or reduces duplication of far objects from the resulting panoramic image (e.g., as depicted in FIG. 5B below). Alternatively, when no objects and/or features that are close appear within the selected stitch(es), the stitch(es) are adjusted according to the far objects, which prevents or reduces disappearance of close objects from the resulting panoramic image (e.g., as depicted in FIG. 5C below).

At 116, the adjusted digital images are provided for creating one or more digital panoramic images, for example, a respective panoramic image for each eye.

Optionally, the adjusted digital images are stitched to create the digital panoramic image(s), optionally according to the selected stitches.

The adjusted digital images may be locally stored by computing device 204 (e.g., in processed image repository 216A), transmitted back to the client terminal 212 that provided the digital images, and/or transmitted to another server 220 and/or storage device 222 for storage and/or stitching into the digital panoramic image. The adjusted digital images may be presented on a display (e.g., 224) to a user.

The created digital panoramic image(s) may be presented on a display (e.g., 224) to a user, transmitted to client terminal 212, storage device 220, server 220, and/or other devices.

Figure 4A:
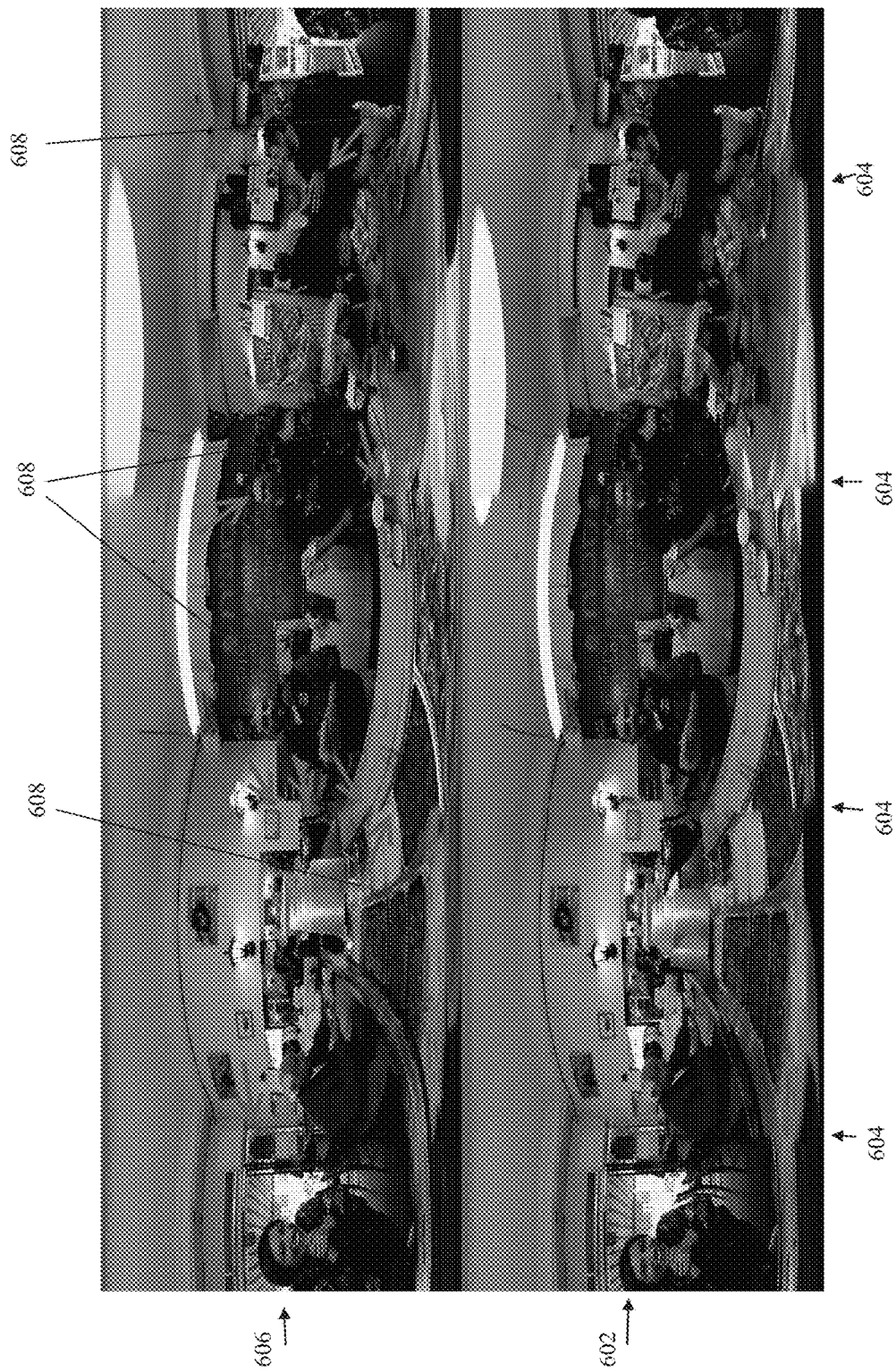
FIGS. 4A-4D are exemplary images comparing a panoramic image created by stitching raw images associated with a parallax shift with a panoramic image created by stitching images adjusted to account for the parallax shift(s) according to depth map(s), in accordance with some embodiments of the present invention.
Figure 4B:
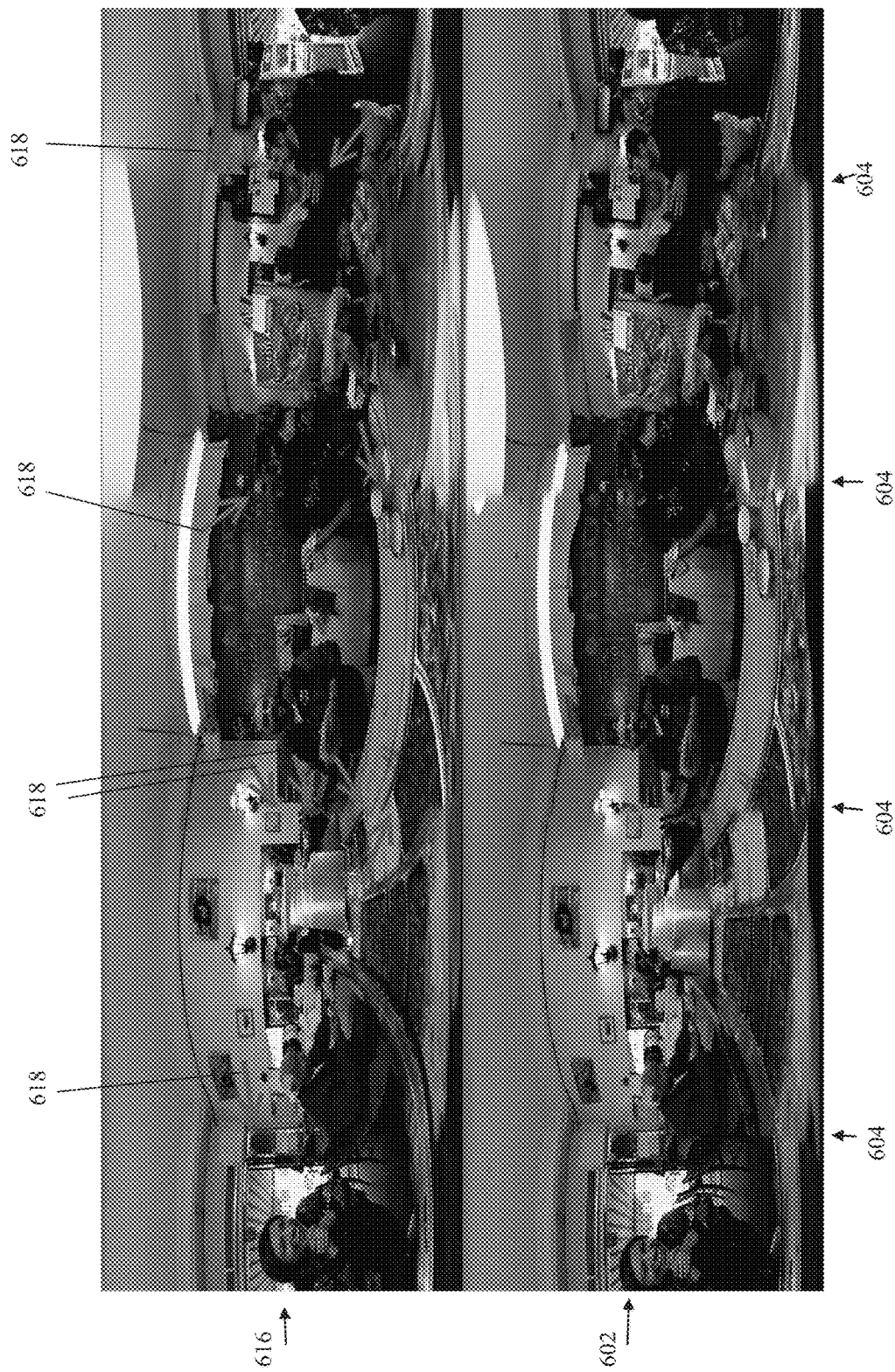
Figure 4C:
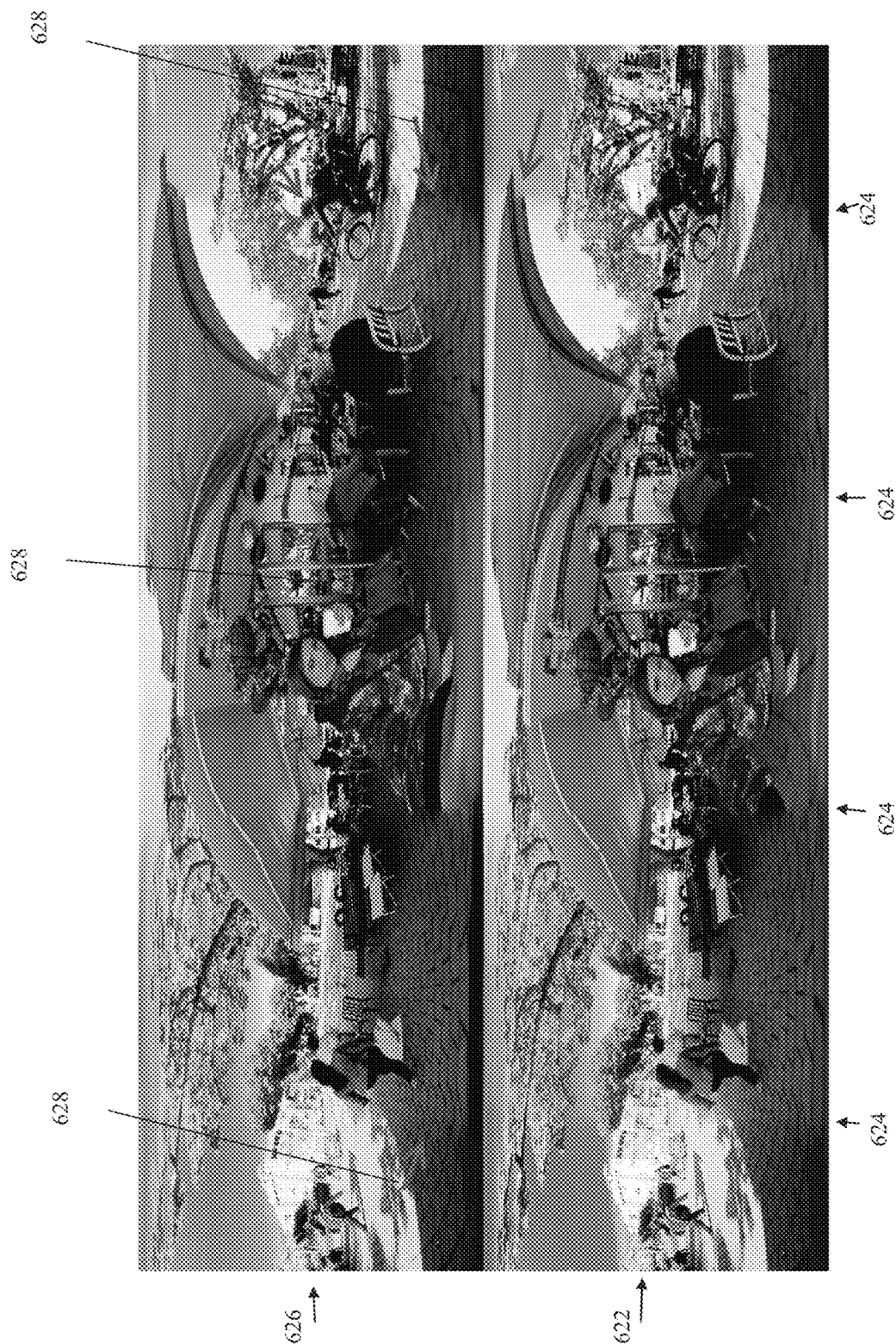
Figure 4D:
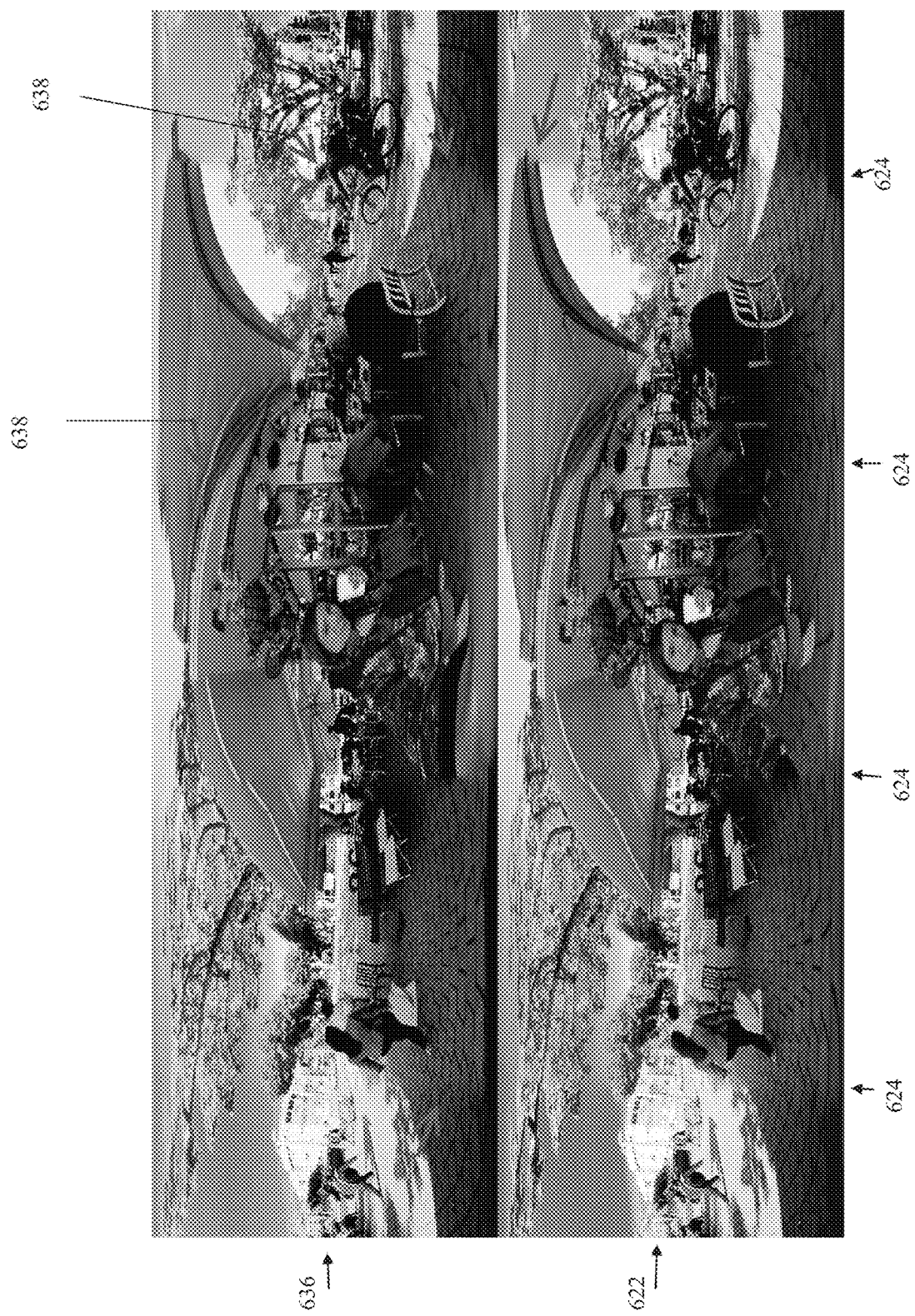

Reference is now made to FIGS. 4A-4D, which are exemplary images comparing a panoramic image created by stitching raw images associated with a parallax shift from a camera(s) (i.e., non-adjusted) with a panoramic image created by stitching images adjusted to account for the parallax shift(s), in accordance with some embodiments of the present invention. FIGS. 4A and 4C depict adjustment according to close objects. FIGS. 4B and 4D depict adjustment according to far objects.

FIG. 4A depicts a panoramic image 602 created by stitching raw images associated with a parallax shift. It is noted that the individual images do not align well along stitch lines 604 due to the parallax shift. In comparison, a panoramic image 606 is created by stitching images adjusted for the parallax shift according to the systems, methods, and/or code instructions described herein. Stitching is adjusted according to close objects detected in the scene, designated by arrows 608.

FIG. 4B depicts panoramic image 602 of FIG. 4A created by stitching raw images associated with a parallax shift. In comparison, a panoramic image 616 is created by stitching images adjusted for the parallax shift according to the systems, methods, and/or code instructions described herein. Stitching is adjusted according to far objects detected in the scene, designated by arrows 618.

FIG. 4C depicts a panoramic image 622 created by stitching raw images associated with a parallax shift. It is noted that the individual images do not align well along stitch lines 624 due to the parallax shift. In comparison, a panoramic image 626 is created by stitching images adjusted for the parallax shift according to the systems, methods, and/or code instructions described herein. Stitching is adjusted according to close objects detected in the scene, designated by arrows 628.

FIG. 4D depicts panoramic image 622 of FIG. 4C created by stitching raw images associated with a parallax shift. In comparison, a panoramic image 636 is created by stitching images adjusted for the parallax shift according to the systems, methods, and/or code instructions described herein. Stitching is adjusted according to far objects detected in the scene, designated by arrows 638.

Figure 5A:
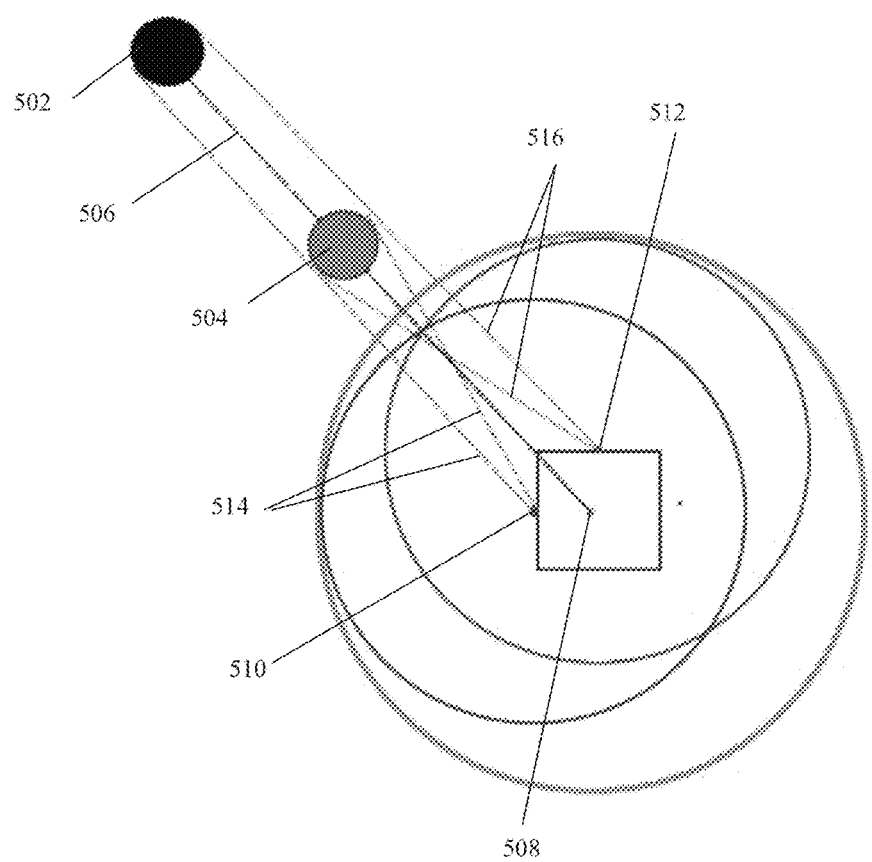
FIGS. 5A-5C are schematics to help understand the technical problem addressed by the systems, methods, and/or code instructions described herein.
Figure 5B:
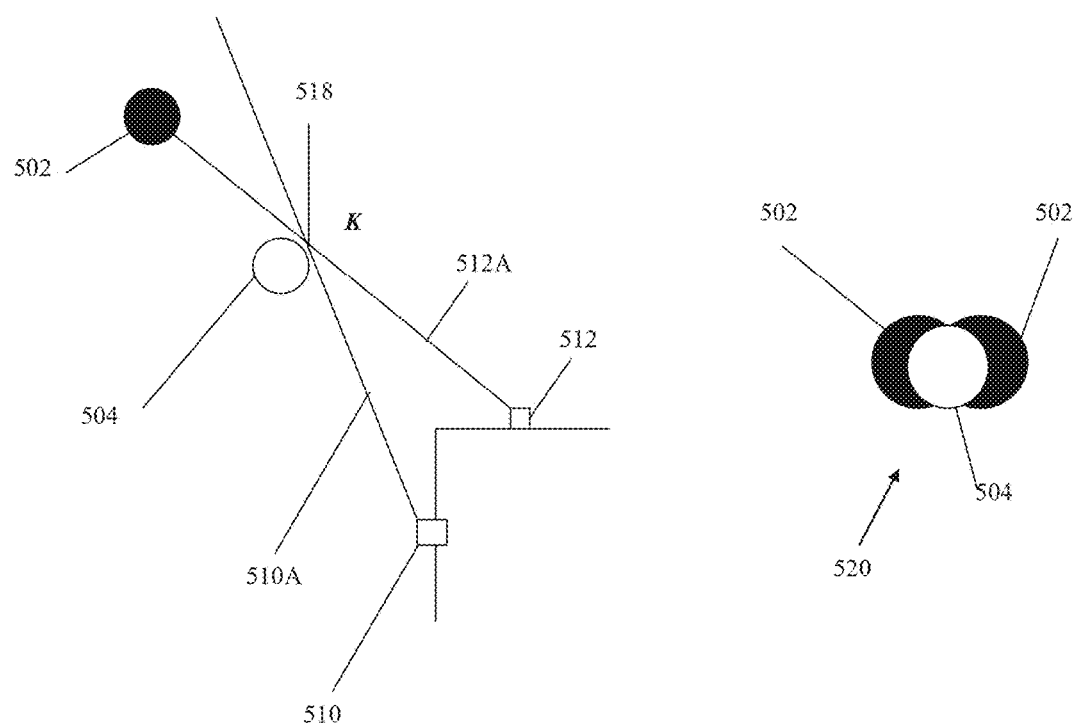
Figure 5C:
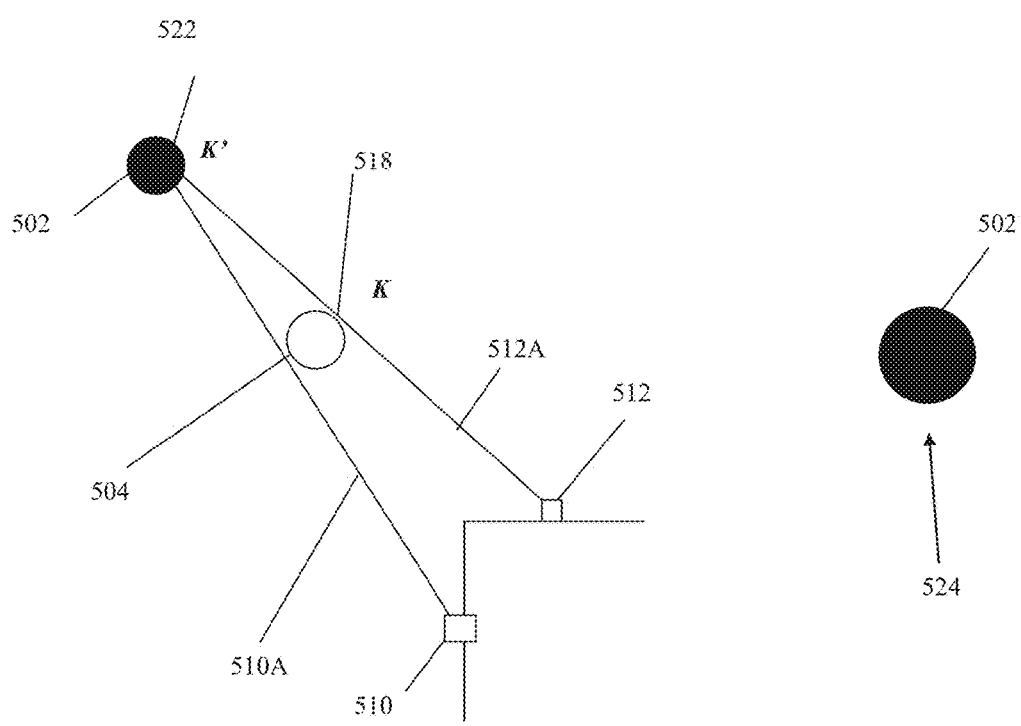

Reference is now made to FIGS. 5A-5C, which are schematics to help understand the technical problem addressed by the systems, methods, and/or code instructions described herein.

FIG. 5A depicts an example scenario in which a parallax shift arises between two images captured by different cameras. A first ball 502 and a second ball 504 are aligned along an axis 506 relative to a center point 508 between a first camera 510 and a second camera 512.

A first image captured by first camera 510, within field of view 514, depicts first ball 502 to the left of second ball 504.

A second image captured by second camera 512, within field of view 516, depicts first ball 502 to the right of second ball 504.

FIG. 5B depicts one example in which the first and second images are combined. A first camera 510 captures images relative to an axis 510A. A second camera 512 captures images relative to an axis 512A. Pixels from first image captured by first camera 510 are extracted until point K 518. Pixels from second image captured by second camera 512 are extracted until point K 518.

Image 520 depicts the resulting panoramic image created by stitching of the first and second images. It is noted that first ball 502 is doubled behind second ball 504.

As described above with reference to block 116, image 520 is created by improper selection of a stitch that is not located along the closer second ball 504, creating doubling of far first ball 502. Selection of stitch(es) along the closer second ball 504 prevents doubling of first ball 502 in the resulting panoramic image.

FIG. 5C depicts another example in which the first and second images are combined. Pixels from first image captured by first camera 510 are extracted until point K' 522. Pixels from second image captured by second camera 512 are extracted until point K' 522.

Image 524 depicts the resulting panoramic image created by stitching of the first and second images. It is noted that only first ball 502 appears. Second ball 504 is not present in image 524.

As described above with reference to block 116, improper selection of the stitch results in a break near close second ball 504, which completely hides second ball 504 from the generated panoramic image 524.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant panoramic images will be developed and the scope of the term panoramic image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of processing digital images associated with a parallax shift for creation of a digital panoramic image, comprising:
   computing a respective depth map storing values denoting distances to regions of a scene, for each camera of a plurality of cameras located at a respective first position;
   capturing a respective image by each of the plurality of cameras at the respective first position;
   virtually rotating each of the plurality of cameras to a plurality of respective second positions at a respective angle around the center point of the respective camera;
   wherein each respective angle is computed according to a certain region of a plurality of regions of the image relative to the center point of the respective camera;
   mapping between each respective region of the image associated with each respective second position and a corresponding region of the respective depth map computed for the respective camera;
   adjusting intensity values of pixels of the regions of each respective image captured by each camera of the plurality of cameras according to corresponding distance values of the mapped regions of the depth map of the respective camera, to create a plurality of adjusted images; and
      stitching the plurality of adjusted images to create a panoramic image;
   wherein the mapping between regions associated with each respective second position to corresponding regions of the respective depth map is computed based on:
   computing a plurality of rays from a center of the respective camera at the first position that captured the image to corresponding regions of the depth map associated with the respective camera, wherein a length of each respective ray is obtained from the distance values of the corresponding region of the depth map;
   translating each of the plurality of rays from the center of the respective camera to a surface of a projection sphere centered at the center of the respective camera, wherein each of the plurality of rays is translated while maintaining the direction, orientation, and length of the respective ray such that each of the plurality of rays is tangent to the projection sphere;
   projecting the region at the distal end of each of the plurality of translated rays having the respective length to a corresponding region of the image captured by the respective camera; and
   adjusting the intensity value of at least one pixel of each region of the image captured by the respective camera according to the distance value of the projected region of the depth map of each of the plurality of translated rays.

2. The method according to claim 1, wherein the mapping is performed according to intrinsic and extrinsic matrixes of the respective camera.

3. The method according to claim 1, wherein regions of the depth map that cannot be mapped to corresponding regions of the image are assigned a minimum intensity value according to an intensity scale.

4. The method according to claim 1, further comprising selecting at least one object appearing in the plurality of adjusted images, wherein the stitching of the plurality of adjusted images is performed such that a stitch line stitching two of the plurality of adjusted images intersects the object.

5. The method according to claim 1, wherein the plurality of cameras are arranged as sets of stereoscopic pairs capturing a first and second set of stereoscopic pairs of overlapping images, wherein the respective depth map is computed for each of the stereoscopic pair of cameras, wherein stitching comprises stitching adjusted first and second sets of overlapping images to create a first and second panoramic image.

6. The method according to claim 5, wherein the stitching is performed according to corresponding locations of the first and second set of stereoscopic pairs of overlapping images.

7. The method according to claim 5, wherein the respective depth map is computed for each of the stereoscopic pair of cameras by performing, for each stereoscopic pair:
   mapping between each corresponding region imaged by each of the cameras of the stereoscopic pair;
   computing three dimensional (3D) coordinates of each corresponding region by triangulation of the respective corresponding region based on images captured by each of the cameras of the stereoscopic pair; and
   converting the 3D coordinates of each corresponding region according to an orientation and distance relative to the center of each camera of the stereoscopic pair.

8. The method according to claim 7, further comprising interpolating undefined regions of the depth map.

9. A computer implemented method of processing digital images associated with a parallax shift for creation of a digital panoramic image, comprising:
   computing a respective depth map storing values denoting distances to regions of a scene, for each camera of a plurality of cameras located at a respective first position;
   capturing a respective image by each of the plurality of cameras at the respective first position;
   virtually rotating each of the plurality of cameras to a plurality of respective second positions at a respective angle around the center point of the respective camera;
   wherein each respective angle is computed according to a certain region of a plurality of regions of the image relative to the center point of the respective camera;
   mapping between each respective region of the image associated with each respective second position and a corresponding region of the respective depth map computed for the respective camera;
   adjusting intensity values of pixels of the regions of each respective image captured by each camera of the plurality of cameras according to corresponding distance values of the mapped regions of the depth map of the respective camera, to create a plurality of adjusted images; and
   stitching the plurality of adjusted images to create a panoramic image;
   analyzing at least one area in proximity to each of the stitches of the plurality of adjusted images, wherein the at least one area is located within an overlapping region;

computing a binocular disparity value for each feature point in each at least one area;

identifying, for each stitch, the most frequent binocular disparity value for the at least one area of the respective stitch;

computing, for each stitch, a radius value according to the most frequent binocular disparity value;

wherein the mapping of regions of each image located within the at least one area in proximity to each of the stitches of each image is performed according to a projection sphere having the radius value associated with the respective stitch.

10. The method according to claim 9, wherein a single depth value is assigned to the at least one area in proximity to each of the stitches of each overlapping region.

11. The method according to claim 9, wherein the mapping is performed for the at least one area in proximity to each of the stitches of each overlapping region of the plurality of adjusted images.

12. The method according to claim 11, wherein the mapping is not performed for other portions of the plurality of adjusted images external to the at least one area in proximity to each of the stitches.

13. The method according to claim 1, wherein the depth map is implemented as a two dimensional (2D) data structure, wherein the values denoting distances are calculated per image captured by each respective camera of the plurality of cameras.

14. The method of claim 1, wherein the received plurality of digital images capture a 360×180 field of view, and wherein at least one of the plurality of digital images overlaps with four other digital images.

15. A system for processing digital images associated with a parallax shift for creation of a digital panoramic image, comprising:
a non-transitory memory having stored thereon a code for execution by at least one hardware processor of a computing device, the code comprising:
code for computing a respective depth map storing values denoting distances to regions of a scene, for each camera of a plurality of cameras located at a respective first position;
code for capturing a respective image by each of the plurality of cameras at the respective first position;
code for virtually rotating each of the plurality of cameras to a plurality of respective second positions at a respective angle around the center point of the respective camera,
wherein each respective angle is computed according to a certain region of a plurality of regions of the image relative to the center point of the respective camera;
code for mapping between each respective region of the image associated with each respective second position and a corresponding region of the respective depth map computed for the respective camera;
code for adjusting intensity values of pixels of the regions of each respective image captured by each camera of the plurality of cameras according to corresponding distance values of the mapped regions of the depth map of the respective camera, to create a plurality of adjusted images; and
code for stitching the plurality of adjusted images to create a panoramic image;
wherein the mapping between regions associated with each respective second position to corresponding regions of the respective depth map is computed based on:

computing a plurality of rays from a center of the respective camera at the first position that captured the image to corresponding regions of the depth map associated with the respective camera, wherein a length of each respective ray is obtained from the distance values of the corresponding region of the depth map;
translating each of the plurality of rays from the center of the respective camera to a surface of a projection sphere centered at the center of the respective camera, wherein each of the plurality of rays is translated while maintaining the direction, orientation, and length of the respective ray such that each of the plurality of rays is tangent to the projection sphere;
projecting the region at the distal end of each of the plurality of translated rays having the respective length to a corresponding region of the image captured by the respective camera; and
adjusting the intensity value of at least one pixel of each region of the image captured by the respective camera according to the distance value of the projected region of the depth map of each of the plurality of translated rays.

16. A non-transitory computer program product for processing digital images associated with a parallax shift for creation of a digital panoramic image, comprising:
a non-transitory memory having stored thereon a code for execution by at least one hardware processor of a computing device, the code comprising:
instructions for computing a respective depth map storing values denoting distances to regions of a scene, for each camera of a plurality of cameras located at a respective first position;
instructions for capturing a respective image by each of the plurality of cameras at the respective first position;
instructions for virtually rotating each of the plurality of cameras to a plurality of respective second positions at a respective angle around the center point of the respective camera;
instructions each respective angle is computed according to a certain region of a plurality of regions of the image relative to the center point of the respective camera;
instructions for mapping between each respective region of the image associated with each respective second position and a corresponding region of the respective depth map computed for the respective camera;
instructions for adjusting intensity values of pixels of the regions of each respective image captured by each camera of the plurality of cameras according to corresponding distance values of the mapped regions of the depth map of the respective camera, to create a plurality of adjusted images; and
instructions for stitching the plurality of adjusted images to create a panoramic image;
wherein the instructions for mapping between regions associated with each respective second position to corresponding regions of the respective depth map comprises instructions for:
computing a plurality of rays from a center of the respective camera at the first position that captured the image to corresponding regions of the depth map associated with the respective camera, wherein a length of each respective ray is obtained from the distance values of the corresponding region of the depth map;

translating each of the plurality of rays from the center of the respective camera to a surface of a projection sphere centered at the center of the respective camera, wherein each of the plurality of rays is translated while maintaining the direction, orientation, and length of the respective ray such that each of the plurality of rays is tangent to the projection sphere;

projecting the region at the distal end of each of the plurality of translated rays having the respective length to a corresponding region of the image captured by the respective camera; and adjusting the intensity value of at least one pixel of each region of the image captured by the respective camera according to the distance value of the projected region of the depth map of each of the plurality of translated rays.

* * * * *